(No Model.)
R. HAYDEN.
CUTTING SHEARS.
No. 452,917. Patented May 26, 1891.
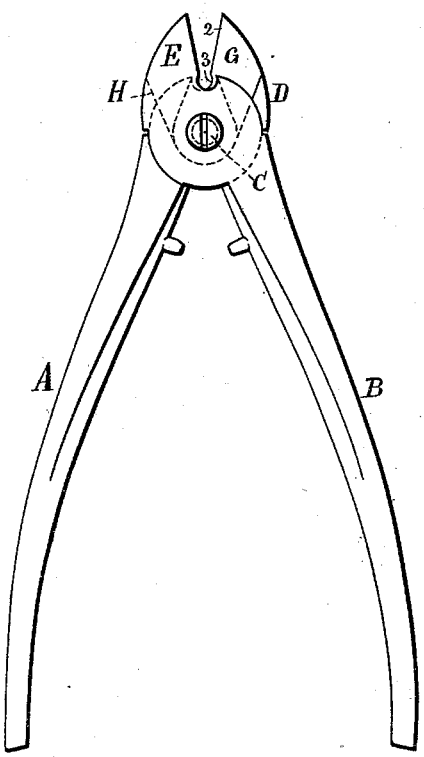
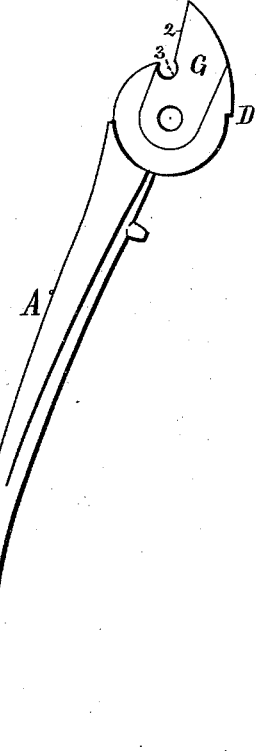
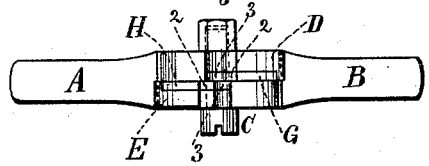
Witnesses:
J. Staib
Chas H Smith
Inventor:
Randolph Hayden
per Lemuel W. Serrell
Atty.
THE NORRIS PETERS CO., PHOTO-LITHO., WASHINGTON, D. C.

UNITED STATES PATENT OFFICE.

RANDOLPH HAYDEN, OF HADDAM, CONNECTICUT.

CUTTING-SHEARS.

SPECIFICATION forming part of Letters Patent No. 452,917, dated May 26, 1891.

Application filed December 17, 1888. Serial No. 293,813. (No model.)

*To all whom it may concern:*

Be it known that I, RANDOLPH HAYDEN, of Haddam, in the county of Middlesex and State of Connecticut, have invented an Improvement in Cutting-Shears, of which the following is a specification.

The object of this invention is to provide a cheap and efficient tool for cutting off wire, and also for shearing or trimming sheet metal, and this tool is especially useful to watch and clock makers, where wire frequently has to be cut and where the springs made use of in the watch or clock movements have to be trimmed or cut to length.

In practice it is difficult to cut hardened sheet-steel, such as watch or clock springs, and the tools require frequent grinding to keep the cutting-edges in a proper condition. I make use of lever-handles pivoted together and provided with head pieces or stocks to which the steel-cutting jaws are connected so that they can be removed with facility for grinding or for replacing a broken cutter.

In the drawings, Figure 1 is an elevation of the cutting-shears. Fig. 2 is an end view of the same, and Fig. 3 shows one of the handles with the jaw or head and the removable cutter in place.

The handles A and B are pivoted together by the bolt C, and the head portions D and E extend at the opposite sides of the fulcrum to the handle portions A and B, and the interior faces of the heads D and E are recessed around the fulcrum pin or bolt C, and to the ends or points of the heads D and E, and into these recesses the cutters G and H are introduced. These cutters are preferably exactly alike, and each cutter fits tightly into the recess provided for it in the head or stock, and each cutter is provided with a hole through which the pivot-screw C passes, and there is a straight cutting-edge 2 at one side of each cutter and a notch at 3, so that when the parts of the tool are put together and secured by the pivot-screw the cutters lie face to face upon each other and within the recesses of the stocks or heads, and the notches 3 are contiguous, so that when the instrument is opened a piece of wire can be inserted into the notches and easily cut off, because the notches are so close to the fulcrum-pin that the leverage of the handles in cutting such wire is sufficient to perform the work with but little pressure of the hand, and the cutting-edges 2 of the respective jaws move in contact with each other in a manner similar to the blades of scissors or shears, and being of but little length from the fulcrum-screw C the handles A B have an ample leverage for moving such jaws and cutters in separating steel or other sheet metal, and I remark that the jaws or heads D E behind the respective cutters G H are to be sufficiently heavy and strong to properly support the said cutters while in use upon wire or sheet metal.

I do not claim removable jaws, nor wire-cutters having jaws that are notched; neither do I claim cutters introduced into recesses in the heads of the handles, as these have been used.

I claim as my invention—

The cutting-pinchers composed of the handles A B, connected by the pivot-screw C and having the heads or jaws D E, that are recessed in their adjacent faces, in combination with the cutting-blades G H, each having a notch 3 and a straight cutting-edge 2 and a hole for the pivot-screw and fitting tightly into the recess in the head or jaw of the lever-handles, substantially as set forth.

Signed by me this 4th day of December, 1888.

RANDOLPH HAYDEN.

Witnesses:
MINER C. HAZEN,
ARNOLD H. HAYDEN.